US007946911B2

(12) United States Patent
Vang et al.

(10) Patent No.: US 7,946,911 B2
(45) Date of Patent: May 24, 2011

(54) COMMUNITY CARD PAI GOW

(76) Inventors: Lieng Hong Vang, Porterville, CA (US); Orville Allen Ennis, Porterville, CA (US)

( * ) Notice: Subject to any disclaimer, the term of this patent is extended or adjusted under 35 U.S.C. 154(b) by 171 days.

(21) Appl. No.: 12/396,362

(22) Filed: Mar. 2, 2009

(65) Prior Publication Data

US 2010/0222122 A1 Sep. 2, 2010

(51) Int. Cl.
*A63F 13/00* (2006.01)
*A63F 1/18* (2006.01)

(52) U.S. Cl. ............ 463/13; 463/11; 273/292; 273/293; 273/306

(58) Field of Classification Search .............. 463/10–13, 463/16–22, 25–29, 40–42; 273/138.1, 139, 273/142 B, 142 A, 142 J, 148 A, 148 R, 148 B, 273/149 P, 149 R, 274, 292–293, 304, 306, 273/309
See application file for complete search history.

(56) References Cited

U.S. PATENT DOCUMENTS

| | | | | |
|---|---|---|---|---|
| 5,489,101 | A * | 2/1996 | Moody | 273/292 |
| 5,810,354 | A * | 9/1998 | Banyai | 273/292 |
| 6,270,078 | B1 | 8/2001 | Leone et al. | |
| 6,371,484 | B1 * | 4/2002 | Yuan | 273/292 |
| 6,386,973 | B1 * | 5/2002 | Yoseloff | 463/13 |
| 6,443,455 | B1 * | 9/2002 | Webb | 273/274 |
| 6,467,771 | B1 * | 10/2002 | deKeller | 273/274 |
| 6,474,646 | B1 * | 11/2002 | Webb | 273/274 |
| 6,793,220 | B1 | 9/2004 | Feola | |
| 6,811,153 | B1 * | 11/2004 | Ko | 273/292 |
| 7,364,161 | B2 * | 4/2008 | Lo | 273/292 |
| 7,441,778 | B2 | 10/2008 | Waken | |
| 7,451,987 | B1 | 11/2008 | Feola | |
| 7,455,297 | B2 | 11/2008 | Tang | |
| 7,481,433 | B1 * | 1/2009 | Karr et al. | 273/292 |
| 7,510,190 | B2 * | 3/2009 | Snow et al. | 273/292 |
| 7,552,927 | B2 * | 6/2009 | Moss | 273/274 |
| 7,722,048 | B2 * | 5/2010 | Smith et al. | 273/292 |
| 2003/0073476 | A1 * | 4/2003 | Friedman | 463/13 |
| 2003/0114209 | A1 | 6/2003 | Ritner et al. | |
| 2004/0262844 | A1 * | 12/2004 | Manzo et al. | 273/292 |
| 2005/0242506 | A1 * | 11/2005 | Yoseloff | 273/292 |
| 2006/0084505 | A1 * | 4/2006 | Yoseloff et al. | 463/42 |
| 2006/0087080 | A1 | 4/2006 | Waken | |
| 2006/0119044 | A1 * | 6/2006 | Kekempanos et al. | 273/292 |
| 2007/0075494 | A1 * | 4/2007 | Abbott | 273/274 |
| 2007/0145684 | A1 | 6/2007 | Webb et al. | |
| 2007/0205559 | A1 | 9/2007 | Webb et al. | |
| 2007/0235939 | A1 | 10/2007 | Ko | |
| 2008/0099996 | A1 | 5/2008 | Webb | |
| 2008/0122179 | A1 * | 5/2008 | McGurk et al. | 273/292 |
| 2008/0217856 | A1 * | 9/2008 | Okada | 273/292 |
| 2008/0224404 | A1 | 9/2008 | Lo | |
| 2009/0020951 | A1 * | 1/2009 | Colacone | 273/292 |
| 2009/0104962 | A1 * | 4/2009 | Nicely et al. | 463/18 |
| 2009/0121435 | A1 * | 5/2009 | Schultz | 273/292 |
| 2009/0124315 | A1 * | 5/2009 | Snow et al. | 463/13 |

OTHER PUBLICATIONS

"Bonus Pai Gow Poker Rules and Terms"; WildJack Site Map; 2006 Wild Jack Gaming; Wild Jack Online Casino; accessed Dec. 7, 2008; html file printed Mar. 18, 2009; 4 pages.

(Continued)

*Primary Examiner* — Arthur O. Hall
(74) *Attorney, Agent, or Firm* — Frommer Lawrence & Haug LLP; Patrick R. Turner

(57) ABSTRACT

A method of playing a game, such as a wagering game, that includes dealing, from a deck of cards, a hand to each player of the game, selecting a community card from the deck of cards, and allowing each of the plurality of player cards to be arranged into a high hand and a low hand. Each player of the game has an option to use the community card in lieu of either one of the player cards in the high hand or one of the player cards in the low hand. In one example, the method further includes receiving a community card ante, or commission, from each of the players in exchange for the option to use of the community card.

5 Claims, 4 Drawing Sheets

OTHER PUBLICATIONS

"Online Bonus Pai Gow Poker"; WildJack Site Map; 2006 Wild Jack Gaming; Wild Jack Online Casino; http://www.wildjack.co.uk/paigowpoker.php; retrieved Mar. 18, 2009; 3 pages.

Pai Gow Poker Side Bets—Odds and Strategy =—The Wizard of Odds; http://wizardofodds.com/parts/images/logo-chancery.gif; 3Dwizardofodds.com; accessed Dec. 7, 2008; pp. 1-61; html file printed Mar. 18, 2009.

"Fortune Pai Gow Poker"; 1997-2009 Wizard of Odds Consulting, Inc.; http://wizardofodds.com/fortunepaigow; retrieved on Mar. 18, 2009; pp. 1-9.

* cited by examiner

COMMUNITY CARD PAI GOW

TECHNICAL FIELD

The invention is related to a game, and in particular, but not exclusively, to a wagering game having at least some of the game play rules of traditional poker.

BACKGROUND OF THE INVENTION

Pai Gow is a Chinese wagering game dating back to at least the 13$^{th}$ century A.D. Although traditionally played with a set of Chinese dominoes, the game has been adapted for play in casinos and other wagering venues. The game of Pai Gow poker, or Asian or Chinese poker, is loosely based on the traditional game of Pai Gow but incorporates player cards and some poker rules. The name "Pai Gow" can refer both to the traditional game played with Chinese dominoes or a poker form of the game played with player cards.

BRIEF SUMMARY OF THE INVENTION

A method of playing a poker game that includes dealing, from a deck of cards, a hand to a dealer and to a player of the game, A community card is selected from the deck of cards. The dealer's hand of cards and the player's hand of cards are each arranged into a high hand and a low hand. The player has an option to use the community card in lieu of one of the cards in the player's high hand or one of the cards in the player's low hand. The player's high hand is compared to the dealer's high hand. The player's low hand is compared to the dealer's low hand. The player is paid out when the player's high hand has a higher poker value than the dealer's high hand and the player's low hand has a higher poker value than the dealer's low hand.

BRIEF DESCRIPTION OF THE DRAWINGS

Non-limiting and non-exhaustive embodiments of the present invention are described with reference to the following drawings, in which.

DETAILED DESCRIPTION

Figure 1:
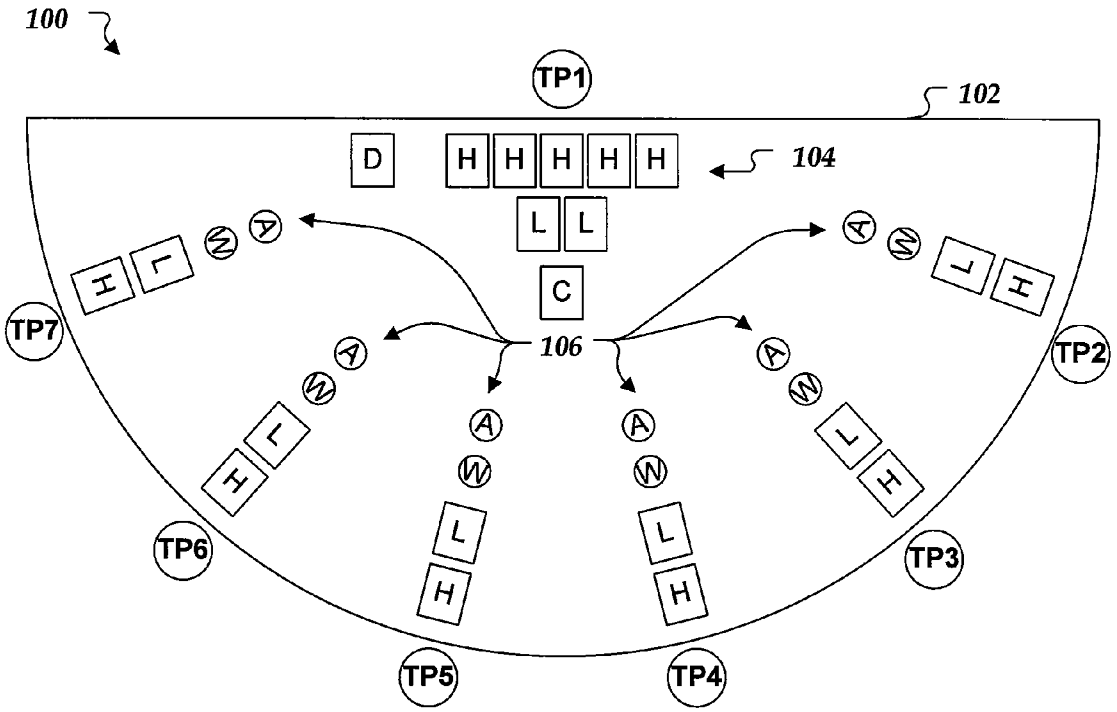
FIG. 1 is a block diagram of an embodiment of an environment in which the invention may be practiced.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "hand" as used herein, refers to a plurality of player cards provided to each player of a game and/or a dealer of a game. The terms "high hand" and "low hand" as used herein, refer to an arrangement of at least some of the player cards provided in a hand. In general, a low hand can be arranged to include fewer player cards than a high hand. In some embodiments, a low hand can be referred to as "the hand in front" or "the second highest hand." In another embodiment, a high hand can be referred to as "the hand behind."

The term "community card" as used herein, refers to a single player card that can be used at a player's discretion in lieu of another player card in the player's hand, such as in lieu of a player card in the player's high hand or in lieu of a player card in the player's low hand. A community card can also be referred to in some embodiments as a "shared card."

The term "dealer" as used herein, refers to a person, entity, or thing that can participate or act in a wagering game. In one embodiment, a dealer is a person that is licensed to deal player cards in a casino, wagering venue, or other establishment. In another embodiment, a local computing device or a networked computing device, such as a computer server, can provide at least some of the functions as a dealer. For example, a computing device can perform provide a virtual dealer that interacts with players over a computer network.

The term "player" as used herein, refers to a person or entity other than the dealer that can participate or act in a wagering game. In one embodiment, a player can place a wager on the outcome of the game using a physical mechanism, such as one or more chips, tokens, or the like. In another embodiment, a player can place a wager on the outcome of a game in a different manner, such as by using an interface associated with a local computing device and/or a networked computing device.

The term "house" as used herein, refers to a person, entity, or host of a wagering game. In some embodiments, the house can include a casino, a wagering venue, or other establishment. In other embodiments, the house can be associated with one or more computing devices for hosting at least a portion of a wagering game either locally or over a computer network.

The term "commission" as used herein, refers to money, credit, or the like that a house collects from each player of a wagering game. In one embodiment, at least a portion of the commission includes a percentage of a player's wager in exchange for the option to use a community card in a game. Such a commission can generally be referred to as a community card ante. For example, a community card ante can include 5% of a player's wager on the outcome of the game.

In another embodiment, at least a portion of the commission is based on whether a player wins the game. For example, in such an embodiment a winning player could be required to pay 5% of the wager as a commission.

In some embodiments, multiple commissions can be collected in a wagering game. For example, a player that pays a 5% commission as a community card ante and a 5% commission for winning the game would pay, in total, a 10% commission.

Alternatively, a single commission can be collected in a wagering game. In one embodiment, a wagering game may only require a community card ante. In another embodiment, a wagering game may only require a commission if a player wins the game. In other embodiments, however, the house may elect to receive no commission or other types of commissions.

Briefly stated, the invention is related to a method for playing a game, such as a wagering game, that includes dealing, from a deck of cards, a hand of player cards to each player of the game, selecting a community card from the deck of cards, and allowing each hand of cards to be arranged into a high hand and a low hand. Each player of the game has an option to use the community card in lieu of one of the player cards in the high hand or one of the player cards in the low hand.

In one embodiment, a dealer is precluded from using the community card. Thus, compared to conventional Pai Gow games, for example, embodiments of the wagering game provide a player with a higher probability of beating a dealer's hand.

In another embodiment, a community card ante is received from each of the players in exchange for the option to use of the community card. In such an embodiment, the community card ante may be based on a player's wager. Accordingly, compared to conventional Pai Gow games, for example, embodiments of the game increase profitability because the house can receive at least a portion of its commission independent of a game's outcome.

In some embodiments, the game allows players to exercise other options. In one embodiment, a player can have the option to be a Player/Banker. In another embodiment, a player can have the option to place a bonus bet. For example, the bonus bet may be a separate wager that a player places on the outcome of a particular hand (e.g., a straight, flush, three of a kind), regardless of whether that player wins the game.

Illustrative Gaming Environment

FIG. 1 shows an environment in which embodiments of the invention may be employed. Not all the elements illustrated in the figures may be required to practice the invention, and variations in the arrangement and type of the elements may be made without departing from the spirit or scope of the invention. In one embodiment, a wagering game is played with a deck of player cards in a casino environment or other wagering venue. In another embodiment, however, the invention, is not so limited, and the wagering game may be played in other types of environments, including virtual environments displayable by one or more computing devices (described further with reference to FIGS. 3 and 4).

Environment 100 includes table 102 with dealer station 104, player stations 106, and various indicia located on table 102. As shown in FIG. 1, the indicia of table 102 are drawn as boxes and circles. In general, such indicia may be used for defining, among other things, the placement locations of one or more player cards, a deck of player cards, a community card, a discard, or a token or chip (representing a wager or ante). The invention, however, is not limited to the specific locations or representations provided by the indicia of table 102. In one embodiment, some of the indicia of table 102 may be omitted. In another embodiment, additional and/or different types of indicia may be employed.

Dealer station 104 and player stations 106 are associated with one of table positions TP1-TP7. Dealer station 104 includes indicia representing a high hand (drawn as five "H" boxes) and a low hand (drawn as two "L" boxes). Dealer station 104 also includes indicia corresponding to a discard ("D") and a community card ("C"). Player stations 106 each include indicia representing a high hand ("H"), a low hand ("L"), a wager ("W"), and a community card ante ("A"). In the embodiment of FIG. 1, player stations 106 include six player stations. However, in other embodiments, more or fewer player stations 106 may be employed.

Generalized Overview

Figure 2:
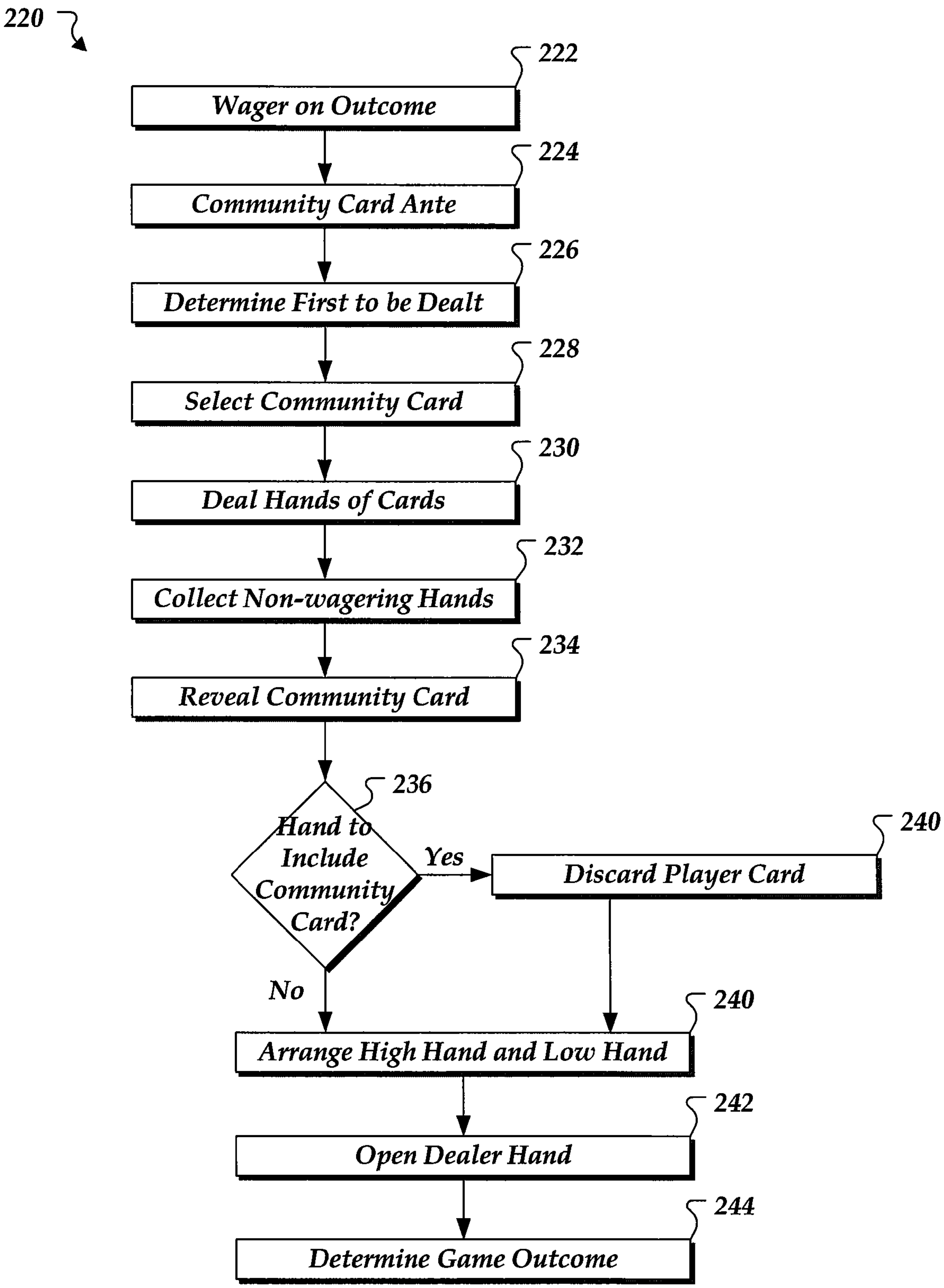
FIG. 2 is a flow diagram generally showing an embodiment of a method for playing a wagering game.

FIG. 2 is a flow diagram generally showing an embodiment of a method for playing a wagering game. In one embodiment, game 220 may be referred to as a game of Texas Pai Gow.

For purposes of demonstration, game 220 is described in the context of a poker game in which a hand of 6 or 7 player cards is employed to form a high hand of 5 player cards and a low hand of 2 player cards. Embodiments of game 220, however, are not so limited. For example, embodiments of game 220 may be played with hands of player cards having more or fewer player cards than 6 or 7 player cards or a different number of player cards in a high hand and/or low hand.

In the context described below, game 220 is played with a deck of 53 player cards, which includes a standard deck of 52 player cards and 1 joker player card. In this context, the rules of game play may dictate that the joker can be used as an ace or to complete a straight, flush, or straight flush. However, other rules of game play are possible and the deck of player cards may have a different number and/or selection of player cards depending on the rules of game play. In another embodiment, for example, game 220 can be played with 54 player cards, which includes a standard deck of 52 player cards and 2 joker player cards.

In one embodiment, block 222-244 define a cycle of game 220. Accordingly, the actions at blocks 222-224 may be repeated at subsequent cycles of game 220. In one embodiment each of blocks 222-244 of game 220 is performed sequentially. Unless the context clearly dictates otherwise, however, individual blocks 222-244 can be omitted, modified, performed in a different order, or combined with other game steps not described in FIG. 2. In one embodiment, for example, "Determine First to be Dealt" (block 226) can be omitted, modified, or performed at a different point in game 220. In another embodiment, for example, "Select Community Card" (block 228) can occur before or after "Deal Hands of Cards" (block 230). In yet another embodiment, for example, a new or shuffled deck of player cards may be provided between cycles of game 220.

Game 220 begins at block 222, where wagers are placed on an outcome of game 220. For example, each player at corresponding player stations 106 of FIG. 1 can make a wager by placing one or more chips, tokens, or the like at corresponding "W" indicia. In one embodiment, each wager can be no less than a required table minimum and no more than a table maximum.

Game 220 continues to block 224, where a community card ante is received by the house. For example, each of the players at player stations 106 of FIG. 1 can provide a community card ante by placing one or more chips, tokens, or the like at corresponding "A" indicia of FIG. 1. In one embodiment, the community card ante is collected or received by the house in exchange for a player's option to use the community card regardless of whether that player wins, pushes, or loses game 220.

In one embodiment, the community card ante is collected before any player cards are dealt in the game. In other embodiments, the community card ante can be collected after the community card is dealt, after all of the player cards are dealt, or after the outcome of game 220 is determined.

In one embodiment, the community card ante of each player is based on the wager provided at block 222. For example, the community card ante can be based on a percentage of a player's wager. Additionally or alternatively, the community card ante can be based on a schedule provided by the house, such as a listing of wagers and a community card ante corresponding to each of the wagers. For example, the schedule may be presented as indicia or the like on table 102 of FIG. 1.

In one embodiment, the community card ante is 5% of a player's wager. Alternatively, the community card ante can be larger or smaller than 5% of a player's wager. In another embodiment, the community card ante is a pre-determined calculation based on the odds of the house (or players) winning the game.

In the embodiments of game 220 described below, a player is required to provide the community card ante regardless of whether that player ultimately uses the community card.

Also, in the embodiments of game 220 described below, a dealer does not have the option to use the community card and thus does not provide the community card ante. In other embodiments of game 220, however, a game could employ a dealer option to use the community card ante.

Game 220 continues to block 226, where the first position to be dealt is determined. For example, the first position to be dealt can be dealer station 104 at table position TP1 of FIG. 1. Alternatively, the first position can be one of player stations 106 at a corresponding one of table positions TP1-TP6. In one embodiment, the first position to be dealt is determined by generating a random number, such as by using a random number machine or by using a set of 3 six-sided dice. For example, table position TP3 can be the first dealt to be dealt to when the number 3 is generated by a random number machine. Alternatively, table position TP3 can be the first to be dealt to when the dice provide one of the numbers 3, 10, or 17.

Game 220 continues to block 228, where the community card is selected from the deck of cards. For example, a dealer may select the community card by dealing the player card from the top card position of a shuffled deck of cards. Alternatively, the dealer may select the community card from another position in a shuffled deck of cards. In one embodiment, the community card can be selected and then positioned face down at indicia "C" of table 102 of FIG. 1.

Game 220 continues to block 230, where a hand of 7 cards is dealt from the deck of cards to a dealer and each player starting from a position determined at block 226. The player cards may be dealt in a clockwise or anticlockwise rotation such that an entire hand of cards is dealt to a table position before the next player (or dealer) table position in the rotation. For example, hands of player cards can be dealt face down to corresponding dealer station 104 and individual player stations 106 of FIG. 1.

After dealing the cards, the dealer may discard the three remaining cards. For example, the dealer may place the remaining cards at indicia "D" of FIG. 1.

Game 220 continues to block 232, where player hands that do not have an associated wager are collected. For example, if table positions TP4 and TP5 of FIG. 1 do not have an associated player, the dealer can collect the hands dealt to table positions TP4 and TP5.

Game 220 continues to block 234, where the community card is revealed. In one embodiment, the dealer can reveal the community card by turning the community card at indicia "C" of FIG. 1 face up.

Game continues to decision block 236, where each of the players can exercise the option to use the community card. If a player chooses to use the community card, game 220 continues to block 238 for that player; otherwise game 220 continues to block 240 for each player that declined the option. In some embodiments, although drawn separately, blocks 236, 238, and 240 can be carried out in parallel.

At block 238 each player that exercises the community card option chooses one player card from a corresponding hand to be discarded and that card is no longer to be used in the game. For example, a player can discard a player card by giving the player card face down to a dealer and having the dealer place the card at indicia "D" of FIG. 1 such that the player no longer has access to the discarded card.

Game 220 continues to block 240, where each of the player hands is arranged, face down, into a high hand of 5 cards and a low hand of 2 cards. For example, a low hand can be arranged at indicia "L" of individual player stations 106 of FIG. 1 and a high hand can be arranged at indicia "H" of individual player stations 106.

The high hand and low hand each includes a selection of cards from a 7-card hand (if a player card was not discarded from the hand) or a selection of cards from a 6-card hand (if a player card was discarded from the hand). In general, the players are responsible for arranging their respective cards into a high hand or a low hand. In some embodiments, however, the dealer may assist in arranging a player's hand or otherwise offer advice upon player request but typically cannot be held responsible for the final arrangement. In one embodiment, for example, a player automatically loses if a low hand has a higher poker value than a counterpart high hand.

In one embodiment, the high hand and counterpart low hand are arranged (or set) so that the high hand has a higher poker value than the low hand. Table 1 demonstrates an example of incorrectly and correctly arranged high hands and counterpart low hands.

TABLE 1

| | |
|---|---|
| Incorrect hand (The 2 card low hand ranks higher than the 5 card high hand) | |
| 2 card low hand | K-K |
| 5 card high hand | 10-10-Q-8-4 |
| Correct hand (The 2 card low hand ranks lower than the 5 card high hand) | |
| 2 card low hand | 10-10 |
| 5 card high hand | K-K-Q-8-4 |

Table 2 demonstrates an example of a correctly arranged hand employing a community card. In this example, the low hand includes a single player card and the "10" community card (e.g., the 10 of hearts, spades, clubs, or diamonds) creates a pair in the low hand. Although not shown, the 10 could also be used in one or more other player's high hands or low hands to complete a pair, flush, straight, or straight flush in that player's hand.

TABLE 2

| | |
|---|---|
| 1 Card low hand (The community card completes a pair in the 2 card low hand) | |
| community card | 10 |
| 2 card low hand | 10- |
| 5 card high hand | K-K-Q-8-4 |

Table 3 demonstrates an example of a correctly arranged hand employing a community card. In this example, the high hand includes four player cards and the "K" community card (e.g., the king of hearts, spades, clubs, or diamonds) creates a pair in the hand hand. As discussed above, a community card is shared by other players of the game such that other players can use the community card to complete a pair, flush, straight, or straight flush.

TABLE 3

| 4 Card high hand (The community card completes a pair in the 5 card high hand) | |
|---|---|
| community card | K |
| 2 card low hand | 10-10 |
| 5 card high hand | K-Q-8-4- |

Game 220 continues to block 242, where a dealer hand is opened. For example, a dealer hand can be opened by arranging the cards face up, into a dealer high hand of 5 cards and a dealer low hand of 2 cards. In one embodiment, the dealer arranges the cards according to house rules or according to the house way. In general, the term "house way" refers to specific guideline that a particular establishment (or house) requires a dealer to follow in arranging the dealer's low hand and dealer's high hand.

Game 220 continues to block 244, where an outcome of game 220 is determined by comparing a dealer's hand with each player hand. In one embodiment, an outcome of game 220 is based on the rankings associated with traditional poker. For example, the rankings with traditional poker are typically, from highest to lowest, as follows: royal flush, straight flush, four of a kind, full house, flush, straight, three of a kind, two pair, one pair, and high card. In another embodiment, an outcome of game 220 is based on some but necessarily all of the rankings associated with traditional poker.

In general, each player hand is opened starting clockwise or anticlockwise from a table position according to house rules. In one embodiment, a low hand of a player is turned face up before a high hand of that player. If a player exercised the option to use a community card, the missing card in a low hand or a high hand will indicate to the house where the community card is to be played in that player's hand. In one embodiment, player cards of each player will remain on the table face up until the dealer has opened each and every player hand.

A player's hand is a winning hand when that player's low hand and high hand have, respectively, a higher rank than a dealer's low hand and high hand.

In one embodiment, a winning player's wager is paid out to the player. In another embodiment, a winning player's wager is paid out minus a commission. For example, as discussed above, the house may collect a 5% commission on a winning player's wager.

If a player's low hand beats a dealer's low hand but loses against a dealer's high hand (or vice versa), this can be considered a push or tie. When this occurs, that player's wager is not collected by the house. In one embodiment, the player may replay the wager in a subsequent cycle of game 220, however, the player is required to provide another community card ante to play in that cycle. In another embodiment, however, the community card ante may be waived for a player that pushes or ties and continues to the next cycle of play.

If a player's hand loses to both the dealer's low hand and the dealers high hand, the player's hand is a losing hand. When this occurs the player's cards and the player's wagers are collected by the house.

If a player's hand "copies" both the dealer's low hand and the dealers high hand, the player's hand is a losing hand. When this occurs the player's cards and the player's wagers are collected by the house. In general, a copy occurs when the values of the player's cards are identical to the values of the dealer's cards. In many embodiments, the suits of the player cards do not contribute to the value of an individual playing card. Table 4 demonstrates an example of a dealer hand and a player hand that are copies of one another.

TABLE 4

| Dealer hand (can be variously suited) | |
|---|---|
| 2 card low hand | A-8 |
| 5 card high hand | Q-Q-10-6-5 |
| Player hand (can be variously suited) | |
| community card | 10 |
| 2 card low hand | A-8 |
| 5 card high hand | Q-Q-6-5- |

If another cycle of game 220 is to be played, game 220 may loop back to block 222; otherwise, game 220 may be completed.

While described in this context as employing a single community card, other embodiments of game 220 may include more than one community card. Thus, in such embodiments, a high hand and low hand can be formed by employing two or more community cards. For example, in a game that employs two community cards, a high hand could be formed with one, two, or none of the community cards. Likewise, the low hand could include one, two, or none of the community cards. Of course, the rules of game play may be adapted to accommodate games that employ multiple community cards. For example, one rule may stipulate that a low hand can only include one community card, whereas the high hand can include two community cards.

Player/Banker Option

Embodiments of game 220 may be played such that one of the players can elect to be a player/banker. In one embodiment, a player may elect to be player/banker for a single cycle, and another player may elect to be player/banker for a subsequent cycle. In another embodiment, individual players have the option to be player/banker but are not required to be player/banker.

In general, when a player elects to be player/banker, that player collects wagers from players that lose the game and pays out players that win the game (but does not pay out or collect on players that push or tie). Thus, the player/banker is required to have enough money (or chips or tokens) to pay off the community card ante on the player/banker's wager and all winning wagers of the other players and the dealer. For example, if the community card ante is 5%, the player/banker wages $200 against the dealer, and the other players' wagers total $300, the player/banker is required to have a total of $510 available. ($500 covers all the wagers and the $10 is for the 5% community card ante).

In one embodiment, only the player/banker pays the community card ante to the house and the other players of the game do not pay the community card ante. In such an embodiment, the player/banker and the other players of the game may each have the option to use the community card (while the dealer is precluded from using the community card). In other embodiments, however, the player/banker may be precluded from using the community card.

In one embodiment, the player/banker pays a commission on any net winnings. In such an embodiment, the other players may also pay a commission to the house on any corresponding winnings.

In one embodiment, a dealer's wager is based on the player/banker's wager in the last cycle of play. For example, if a player decides to become player/banker and that player's previous wager was $300, that player/banker can wager up to $300 against the house. That is, the player/banker can set the dealer's wager to a value of up to $300.

In one embodiment, each player hand and dealer hand is compared against the player/banker's hand to determine an outcome of the game. For example, at block 244 of FIG. 2, each dealer hand and player hand can be compared to the player/banker's hand instead of each player hand being compared to the dealer hand. In general, the player/banker does not arrange the player/banker hand during that cycle of play. For example, the dealer can set the player/banker hand according to the house way.

In some embodiments, a player/banker of the game can only elect to be player/banker for a single cycle of the game at a time. In such embodiments, the dealer may become banker on the next cycle of the game.

Bonus Bet

Embodiments of game 220 may be played such that one of the players can elect to place a bonus bet. In one embodiment, for example, table 102 may include additional indicia at each of player stations 106 corresponding to such a bonus bet.

In general, an option to place a bonus bet (in addition to any wager) allows a player to wager on the outcome of achieving a particular hand, regardless of whether that player wins the game. For example, the bonus bet may allow a player to wager that the player's hand will include a ranking of three of a kind or better. In such an example, that player may win the bonus bet even if the dealer ultimately has a better hand for that cycle of the game. In other examples, the bonus bet may be based on other rankings, such as a ranking of a straight, flush, four of a kind, and so on.

In one embodiment, the bonus bet may be paid out only if a player does not use the community card. In another embodiment, the bonus bet may have a larger pay out for a hand that is formed without the community card and a smaller pay out for a hand that is formed with the community card.

In one embodiment, at block 224 of game 220 a player may indicate such an election by placing one or more chips or tokens at a bonus bet indicia instead of placing such chips or tokens at the community card ante indicia. In another embodiment, a player may be required to pay the community card ante but may be provided the option to place the bonus bet before the community card is revealed at block 234 of game 220.

Illustrative Virtual Environment

As discussed above, embodiments of game 220 may also in a virtual environment that is displayable by one or more computing devices. For example, such a device may display virtual player cards in lieu of physical player cards. Additionally or alternatively, the virtual environment may be display a graphical icon that is similar to table 102 and the indicia of table 102 of FIG. 1. In these and other embodiments, a player and/or dealer may be represented as a virtual player and/or dealer, respectively, in the form of a graphical icon, avatar, or the like. Such player and/or dealer representations may correspond to live participants of a game and/or automated (computer simulated) participants of a game. For example, a virtual environment may include a single live player, one or more automated players, and an automated dealer. Alternatively, a virtual environment may include two or more live players that are located at separate locations but participate in the game via a computer network.

Figure 3:
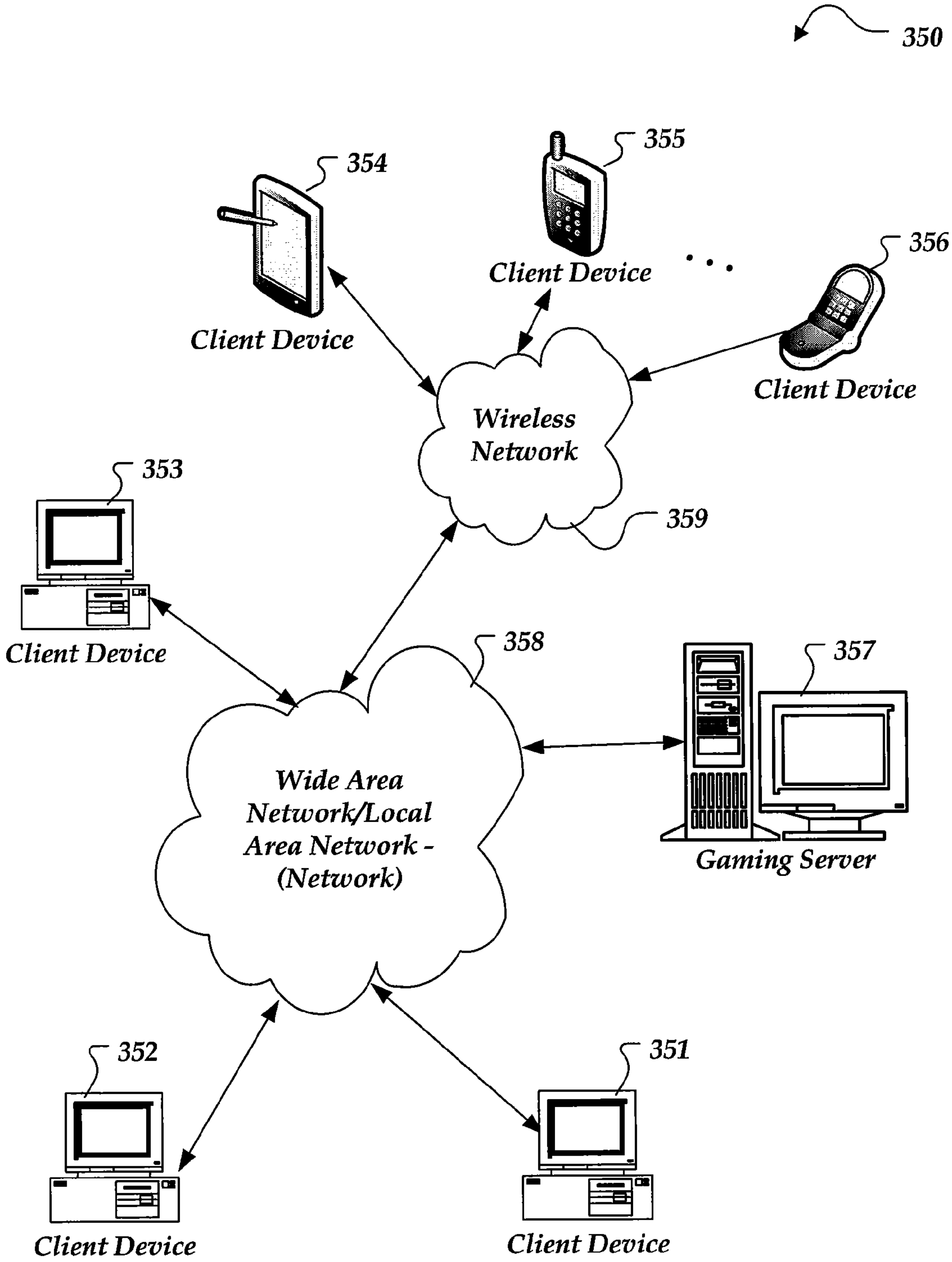
FIG. 3 is block diagram of an embodiment of another environment in which the invention may be practiced.

FIG. 3 shows a system in which a virtual environment may be deployed. As shown, system 350 of FIG. 1 includes client devices 351-356, game server 357, local area networks ("LANs")/wide area networks ("WANs")-(network) 358, and wireless network 359.

Embodiments of client devices 351-356, game server 357, network 358, and wireless network 359 may be employed to enable game play of a wagering game, including embodiments of game 220 of FIG. 2. For example, in one embodiment, game server 357 may host a portion of a wagering game and client device may interact with the wagering game by receiving and/or transmitting content over network 358. Alternatively, in another embodiment, a wagering game may be provided on a client device that does not communicate over a network (e.g., a stand-alone video game machine in a casino or another venue). Accordingly, individual components of FIG. 3 can be omitted or combined with other components not described in FIG. 3. Additionally or alternatively, individual component of FIG. 3 can be modified or have a different type.

Client devices 351-356 may include virtually any device for transmitting to and/or receiving content from another network device. Client devices 354-356 may include virtually any mobile computing device capable of transmitting and/or receiving content over a network, such as wireless network 359, or the like. Client device 351-353 may include virtually any computing device that typically connects using a wired communications medium.

A web-enabled client device may include a browser application that is configured to receive and to send content through webpages, web-based messages, or the like. The browser application may be configured to receive and display graphics, text, multimedia, or the like, employing virtually any web based language.

Client devices 351-356 also may include at least one other client application that is configured to receive content from and/or provide content to another computing device. The client application may include a capability to provide and receive textual content, multimedia information, or the like.

Client devices 351-356 may further be configured to include a client application that enables the user to log into a user account that may be managed by another computing device.

Thus, a user of client devices 351-356 may employ any of a variety of client applications to create, upload, and/or initiate the creation of content at a remote network device.

Network 358 is configured to couple computing devices to each other, including, client devices 351-356, game server 357, and through wireless network 359. Networks 358 and 359 are enabled to employ any form of computer readable media for communicating information from one electronic device to another. Additionally, communication media typically may enable transmission of computer-readable instructions, data structures, program modules, or other types of content, virtually without limit.

Game server 357 is a device that is configured and arranged to receive, provide, and/or assist in providing any of a variety of content associated with a wagering game over a network, such as network 358 and/or wireless network 359. For example, game server 357 may operate as a website for providing and/or accessing such content. Game server 357, however, is not limited to web servers, and may also operate a messaging server, a File Transfer Protocol (FTP) server, a database server, or the like. Although game server 357 is illustrated as a distinct network device, the invention is not so limited. For example, a plurality of network devices may be configured to perform the operational aspects of game server 379.

Figure 4:
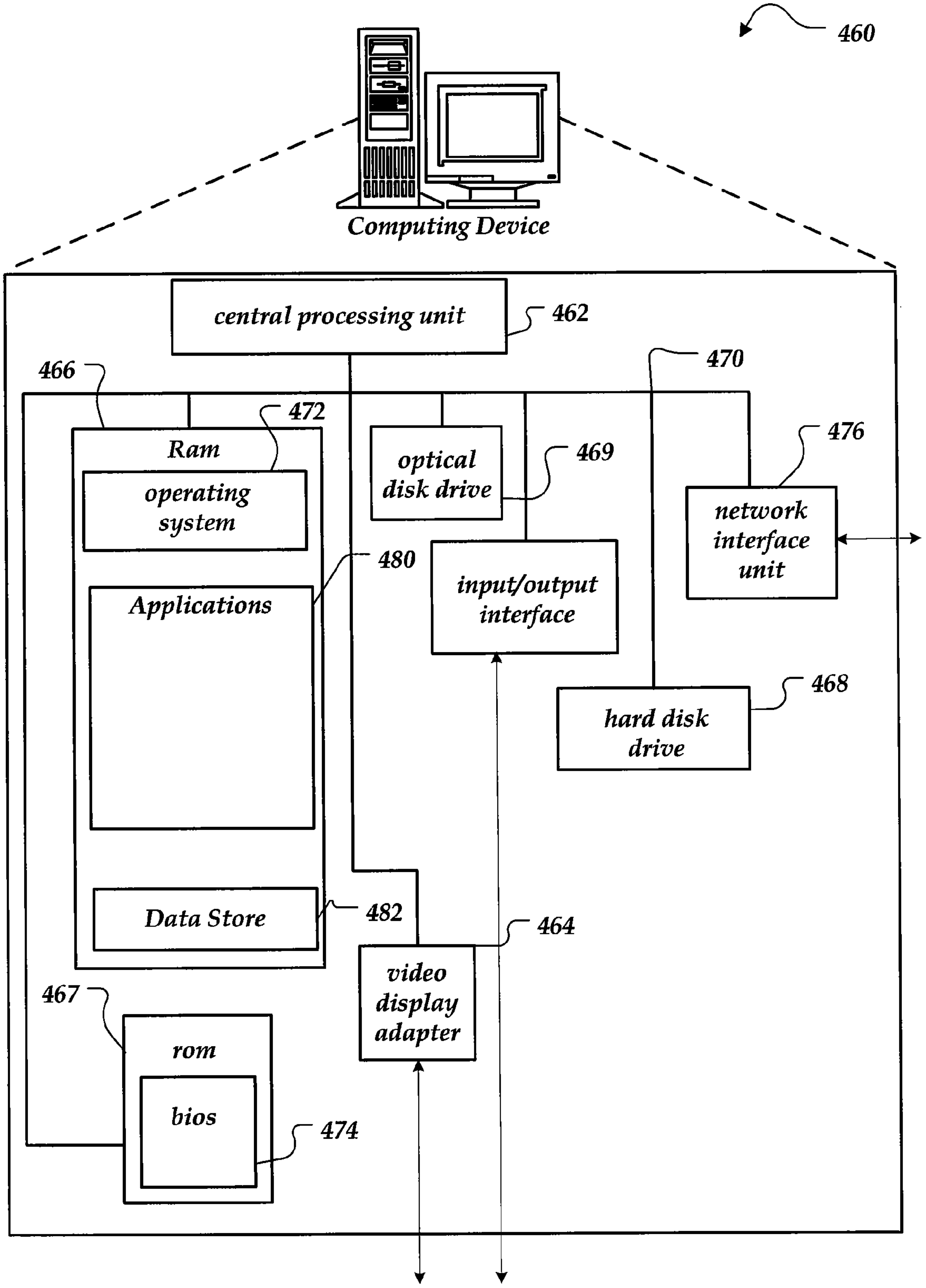
FIG. 4 shows an embodiment of a computing device in which embodiments of the invention may be practiced.

FIG. 4 shows one embodiment of a computing device that may be employed to provide a virtual environment. In one embodiment, device 460 may represent one of client devices 351-356 of FIG. 3. In another embodiment, device 600 may represent gaming server 357 of FIG. 3.

Device 460 may include many more components than those shown. The components shown, however, are sufficient to disclose an illustrative embodiment for practicing the invention. Device 460 includes processing unit 462, video display adapter 464, and a mass memory, all in communication with each other via bus 470. The mass memory generally includes RAM 466, ROM 467, and one or more permanent mass storage devices, such as hard disk drive 468, and removable storage device 469 that may represent a tape drive, optical drive, and/or floppy disk drive. The mass memory stores operating system 472 for controlling the operation of device 460. Any general-purpose operating system may be employed. Basic input/output system ("BIOS") 474 is also provided for controlling the low-level operation of device 460. As illustrated in FIG. 4, device 460 also can communicate with the Internet, or some other communications network, via network interface unit 476.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 480 are loaded into mass memory and run on operating system 472. Examples of application programs may include HTTP programs, customizable user interface programs, transcoders, VPN programs, SMS message servers, IM message servers, email servers, account management and so forth. Applications 480 can include one or more programs for hosting a game either locally or over a network. Such programs can also includes instructions for displaying a game, exchanging communications pertaining to a game, enforcing rules of a game, and so forth. In some embodiments, code and data may be run locally on device 460 or code and data may be distributed across multiple devices.

Data store 482 may include virtually any mechanism usable for storing content associated with a wagering game, including but not limited to a file, a folder, a document, or an application, such as a database, spreadsheet, or the like. Data store 482 is configured to store such content in a variety of formats, including, for example, a text file, an HTML document, an executable application, and so on, or as text or code within a file, spreadsheet, or the like.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A method for playing a pai gow poker game, the method comprising:

receiving a wager from each of at least one player of the game, wherein for each of the at least one player of the game the wager is placed based on an outcome of a current round of the game;

selecting, by the dealer, at least one community card from a physical deck of playing cards, wherein each of the selected at least one community cards is separated from remaining cards of the deck of playing cards and is not shown to the at least one player of the game;

receiving a community card ante from each of the at least one player of the game, wherein for each of the at least one player of the game the community card ante is placed in exchange for an option to use the selected at least one community card during the current round of the game;

dealing, by the dealer, from the remaining cards of the physical deck of cards, a hand of seven playing cards to the dealer and to each of the at least one player of the game;

revealing, by the dealer, the selected at least one community card to the at least one player of the game after the hands of playing cards are dealt to the dealer and to each of the at least one player of the game;

arranging the hand of playing cards dealt to the dealer into a dealer's low hand and a dealer's high hand, wherein the dealer's low hand has two playing cards and the dealer's high hand has five playing cards;

for each of the at least one player of the game, arranging the dealt hand of playing cards into a low hand of the at least one player of the game and a high hand of the at least one player of the game, wherein for each of the at least one player of the game the low hand of the at least one player of the game has two playing cards and the high hand of the at least one player of the game has five playing cards;

wherein each of the at least one player of the game concurrently has an option to use the at least one community card during the current round of the game;

wherein for each of the at least one player of the game that exercises the option of using the at least one community card the at least one player of the game uses the at least one community card during the current round of the game in lieu of either:

at least one of the five playing cards in the high hand of the at least one player of the game; or at least one of the two playing cards in the low hand of the at least one player of the game;

wherein for each of the at least one player of the game that exercises the option of using the at least one community card in lieu of at least one of the five playing cards in the high hand of the at least one player of the game, the at least one player of the game removes at least one of the arranged five playing cards in the high hand of the at least one player of the game for the remainder of the current round of the game;

wherein for each of the at least one player of the game that exercises the option of using the at least one community card in lieu of at least one of the two playing cards in the low hand of the at least one player of the game, the at least one player of the game removes at least one of the arranged two playing cards in the low hand of the at least one player of the game for the remainder of the current round of the game; and determining for each of the at least one player of the game an outcome of the current round of the game by comparing the dealer's low hand with the low hand of the at least one player of the game, and also by comparing the dealer's high hand with the high hand of the at least one player of the game;

wherein determining for each player of the game the outcome of the current round of the game includes paying out the at least one player of the game when both the high hand of the at least one player of the game has a higher poker value than the dealer's high hand; and the low hand of the at least one player of the game has a higher poker value than the dealer's low hand.

2. The method of claim 1, wherein the dealer is precluded from using the at least one community card in lieu of any of the playing cards dealt to the dealer.

3. The method of claim 1, further comprising receiving a commission from the at least one player of the game when the at least one player of the game is paid out.

4. The method of claim 1, further comprising:

allowing one of the at least one player of the game to elect to be player/banker; and receiving a community card ante from the player/banker, wherein the community card ante is based on a wager made by the player/banker.

5. The method of claim 1, further comprising:

for each of the at least one player of the game receiving a bonus bet, wherein the bonus bet is based on a predetermined ranking; and for each of the at least one player of the game paying out the at least one player of the game when at least one of the high hand of the at least one player of the game or the low hand of the at least one player of the game has a ranking that is the same or better than the predetermined ranking.

* * * * *